(12) United States Patent
Furuya et al.

(10) Patent No.: US 9,207,113 B2
(45) Date of Patent: Dec. 8, 2015

(54) SOUND PRESSURE PREDICTION APPARATUS, SOUND PRESSURE PREDICTION METHOD, AND INFORMATION STORAGE MEDIUM

(75) Inventors: Hiroyuki Furuya, Kawasaki (JP); Atsushi Yamaguchi, Kawasaki (JP); Kazuhiro Nitta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1127 days.

(21) Appl. No.: 13/227,175

(22) Filed: Sep. 7, 2011

(65) Prior Publication Data

US 2012/0063606 A1 Mar. 15, 2012

(30) Foreign Application Priority Data

Sep. 9, 2010 (JP) .................. 2010-202377

(51) Int. Cl.
*H04R 29/00* (2006.01)
*G01H 3/14* (2006.01)

(52) U.S. Cl.
CPC ....................... *G01H 3/14* (2013.01)

(58) Field of Classification Search
CPC ...... H04R 29/00; H04R 1/1083; H04R 3/002; G10L 2021/02166; G10K 11/002; G10K 11/16

USPC ............. 381/56, 57, 58, 94.1, 71.1, 122
See application file for complete search history.

(56) References Cited

U.S. PATENT DOCUMENTS

2009/0002939 A1* 1/2009 Baugh et al. .................. 361/687
2009/0092261 A1* 4/2009 Bard ........................... 381/71.1

FOREIGN PATENT DOCUMENTS

JP 2001-108642 4/2001

* cited by examiner

*Primary Examiner* — Alexander Jamal
(74) *Attorney, Agent, or Firm* — Fujitsu Patent Center (57) ABSTRACT

A sound pressure level prediction apparatus includes a storage unit for storing measured sound pressure levels. The sound pressure level prediction apparatus also includes an acquisition unit configured to acquire sound pressure levels measured at a plurality of locations for a first fan and at least one sound pressure level for a second fan, and the at least one sound pressure level being measured at the same location as at least one of the plurality of locations used for measuring the sound pressure levels for the first fan. The sound pressure level prediction apparatus further includes a prediction unit configured to predict, based on the acquired sound pressure levels of the first fan and the at least one sound pressure level for the second fan, a sound pressure level for the second fan at a location where the sound pressure level for the second fan has not yet been measured.

5 Claims, 9 Drawing Sheets

SOUND PRESSURE PREDICTION APPARATUS, SOUND PRESSURE PREDICTION METHOD, AND INFORMATION STORAGE MEDIUM

CROSS-REFERENCE TO RELATED APPLICATION

This application is based upon and claims the benefit of priority from the prior Japanese Patent Application No. 2010-202377 filed on Sep. 9, 2010, the entire contents of which are incorporated herein by reference.

FIELD

The present invention relates to prediction of a loading noise.

BACKGROUND

Conventional electronic devices are often provided with a fan for cooling electronic parts included therein. The fan mounted in electronic devices reduces heat generation of electronic parts caused by the operation of the electronic devices and ambient environments, for example. This reduction makes it possible to prevent failure of electronic devices due to heat generation and to prevent burns and other injuries caused when a user touches a high-temperature electronic device.

Recently, electronic devices having various functions are being produced, and therefore the number of electronic parts required for the electronic device is increasing. Additionally, electronic devices are being reduced in size, and therefore a resistance to an airflow generated by the fan has been increasing. As a result, the rotational speed of fans is increasing, which causes a problem of noise due to the operating sound of fans. To address this, it is preferable that, for an electronic device that needs reduction in noise, appropriate cooling design, fan selection, and control of the rotational speed of a fan, for example, be investigated at the design phase of the electronic device.

An example of a method of predicting noise caused by a fan mounted in an electronic device is a method of predicting noise on the basis of sound pressure level values at a distance of 1 meter from the front on the intake air side of the fan at rotation speeds under no load conditions and under rated load conditions that are offered by a fan manufacturer or the like. Another example of a method of predicting noise caused by a fan mounted in an electronic device is an approach of predicting on the basis of loading noise at an operating point. To predict noise of a fan mounted in an electronic device with higher accuracy, a sound pressure level value, a sound intensity value, and other characteristic values at a plurality of locations are required.

More recently, there has been a technique of predicting a pressure difference between the front and rear of a fan at the operating point by means of thermal analysis so as to predict the loading noise and the amount of air flow at the operating point from the loading noise, the PQ characteristic, and the like of the fan. The term "loading noise" refers to the level of sound under conditions where loads are applied to the airflow passage of a fan.

Japanese Unexamined Patent Application Publication No. 2001-108642 is an example of related art.

SUMMARY

According to an embodiment, a sound pressure level prediction apparatus includes a storage unit for storing measured sound pressure levels. The sound pressure level prediction apparatus also includes an acquisition unit configured to acquire sound pressure levels measured at a plurality of locations for a first fan and at least one sound pressure level for a second fan, the second fan being different from the first fan, and the at least one sound pressure level being measured at the same location as at least one of the plurality of locations used for measuring the sound pressure levels for the first fan. The sound pressure level prediction apparatus further includes a prediction unit configured to predict, based on the acquired sound pressure levels of the first fan and the at least one sound pressure level for the second fan, a sound pressure level for the second fan at a location where the sound pressure level for the second fan has not yet been measured.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a loading noise prediction program, a loading noise prediction apparatus, and a loading noise prediction method provided herein will be described below with reference to the accompanying drawings. It is to be noted that the invention is not intended to be limited to the below embodiments.

First Embodiment

Configuration of Loading Noise Prediction Apparatus

Figure 1:
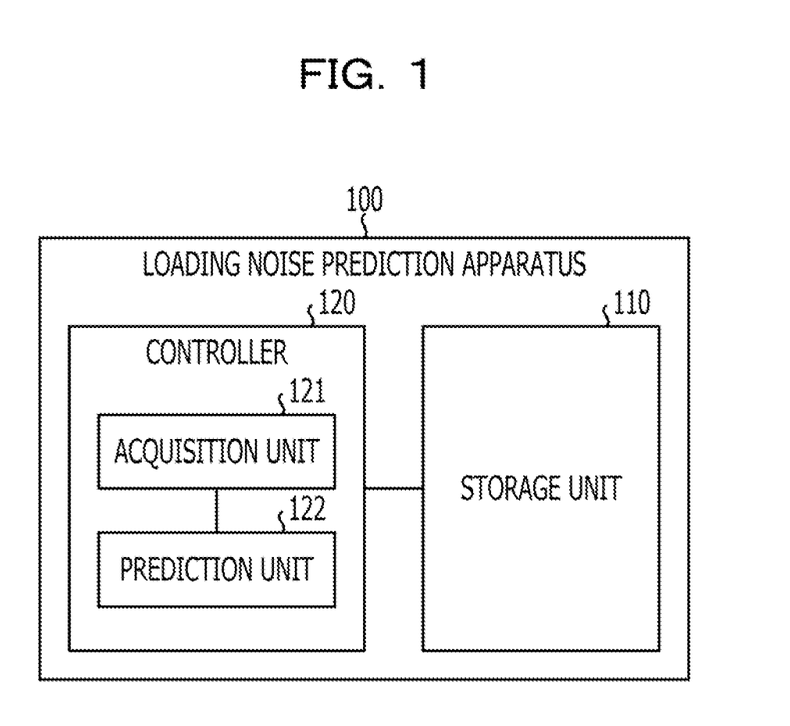
FIG. 1 illustrates an exemplary configuration of a loading noise prediction apparatus according to a first embodiment.

With reference to FIG. 1, the configuration of a loading noise prediction apparatus according to a first embodiment will be described. FIG. 1 illustrates an exemplary configuration of the loading noise prediction apparatus according to the first embodiment. For example, as illustrated in FIG. 1, a loading noise prediction apparatus 100 includes a storage unit 110 and a controller 120.

The storage unit 110 stores data required for various kinds of processing to be performed by the controller 120 and results of various kinds of processing performed by the controller 120. The storage unit 110 is a storage device examples of which include semiconductor memory devices such as a RAM (Random Access Memory), a ROM (Read Only Memory), and a flash memory, hard disks, and optical disks.

The controller 120 includes an internal memory for storing a control program, programs defining various processing procedures, and required data, and controls the entirety of the loading noise prediction apparatus 100. The controller 120 also includes an acquisition unit 121 and a prediction unit 122. The controller 120 is, for example, an integrated circuit such as an ASIC (Application Specific Integrated Circuit) or an FPGA (Field Programmable Gate Array), or an electronic circuit such as a CPU (Central Processing Unit) or an MPU (Micro Processing Unit).

The acquisition unit 121 acquires a sound pressure level measured by using a measurement device that measures loading noise showing a sound pressure level measured under a load applied to an airflow passage of a fan. For example, the acquisition unit 121 acquires sound pressure levels for an arbitrary fan measured at a plurality of locations. In addition, the acquisition unit 121 acquires at least one sound pressure level for a fan that is different from the arbitrary fan and whose loading noise is to be predicted. The at least one sound pressure level is measured at the same location as used for measuring the sound pressure levels of the arbitrary fan.

The acquisition unit 121 acquires sound pressure levels, for example, at a timing at which a user of the loading noise prediction apparatus 100 performs a predetermined operation for starting prediction of loading noise, and at a timing at which a sound pressure level is input from an external device. Sound pressure levels to be acquired by the acquisition unit 121 may be previously stored in an external storage device, such as the storage unit 110, and the like. Sound pressure levels to be acquired by the acquisition unit 121 may also be input from devices, such as storage units, measurement devices, and the like, connected over networks.

Figure 2:
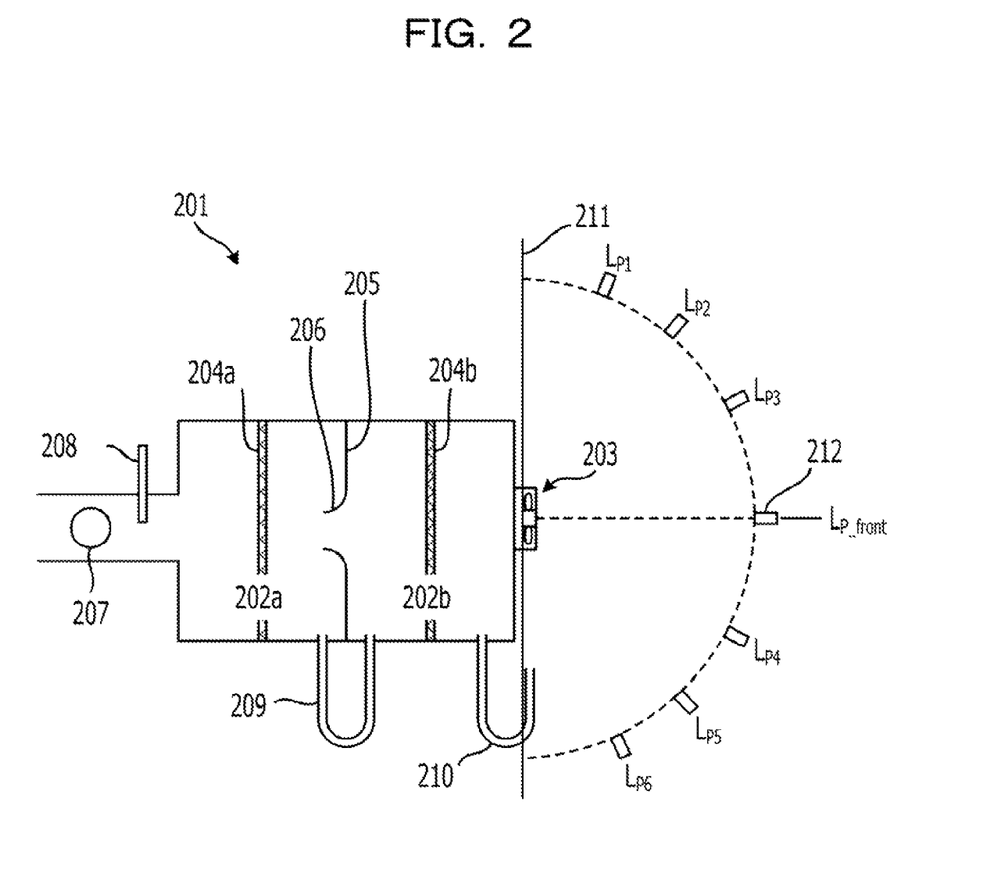
FIG. 2 illustrates a measurement of a sound pressure level of a first fan by using a measurement device for measuring loading noise according to the first embodiment.

Here, with reference to FIG. 2, a measurement of a sound pressure level by using a measurement device for measuring loading noise according to the first embodiment will be described. FIG. 2 illustrates a measurement of a sound pressure level by using a measurement device for measuring loading noise according to the first embodiment. Illustrated in FIG. 2 is an example of a measurement device that measures loading noise on the intake air side of a fan.

For example, as illustrated in FIG. 2, the measurement device 201 includes a plurality of chambers 202a and 202b with rectifying grids 204a and 204b at arbitrary locations. The measurement device 201 also includes a nozzle 206 connecting chambers 202a and 202b partitioned by a chamber partition 205. The nozzle 206 smoothes out the flow of air between the chambers 202a and 202b. The measurement device 201 further includes an auxiliary blower 207 and a damper 208 for adjusting the amount of air flow and load in the chambers 202a and 202b. In addition, the measurement device 201 includes an air flow measurement differential pressure gauge 209 used for a measurement of the amount of air flow between the chambers 202a and 202b, a static-pressure measurement differential pressure gauge 210 used for a measurement of the static pressure in the chambers 202a and 202b, and a first fan 203 for measurements disposed in one end of the chambers 202a and 202b that is different from locations at which the auxiliary blower 207, the damper 208, and the like are disposed.

At locations forming a hemisphere at a distance of 1 meter from the first fan 203, microphones 212 for measuring sound (sound pressure level) generated by rotating the first fan 203 are disposed. The number of microphones 212 and the location of the microphones along the hemisphere may be varied. For example, it is possible to utilize only one microphone and move that one microphone to the individual locations along the hemisphere. A structure for absorbing sound, such as a plate or a sound absorbing material 211 is placed between the first fan 203 and the chambers 202a and 202b. $L_{P\_front}$ illustrated in FIG. 2 is a sound pressure level measured by using a microphone disposed at a distance of 1 meter in front of the first fan 203.

Figure 2A:
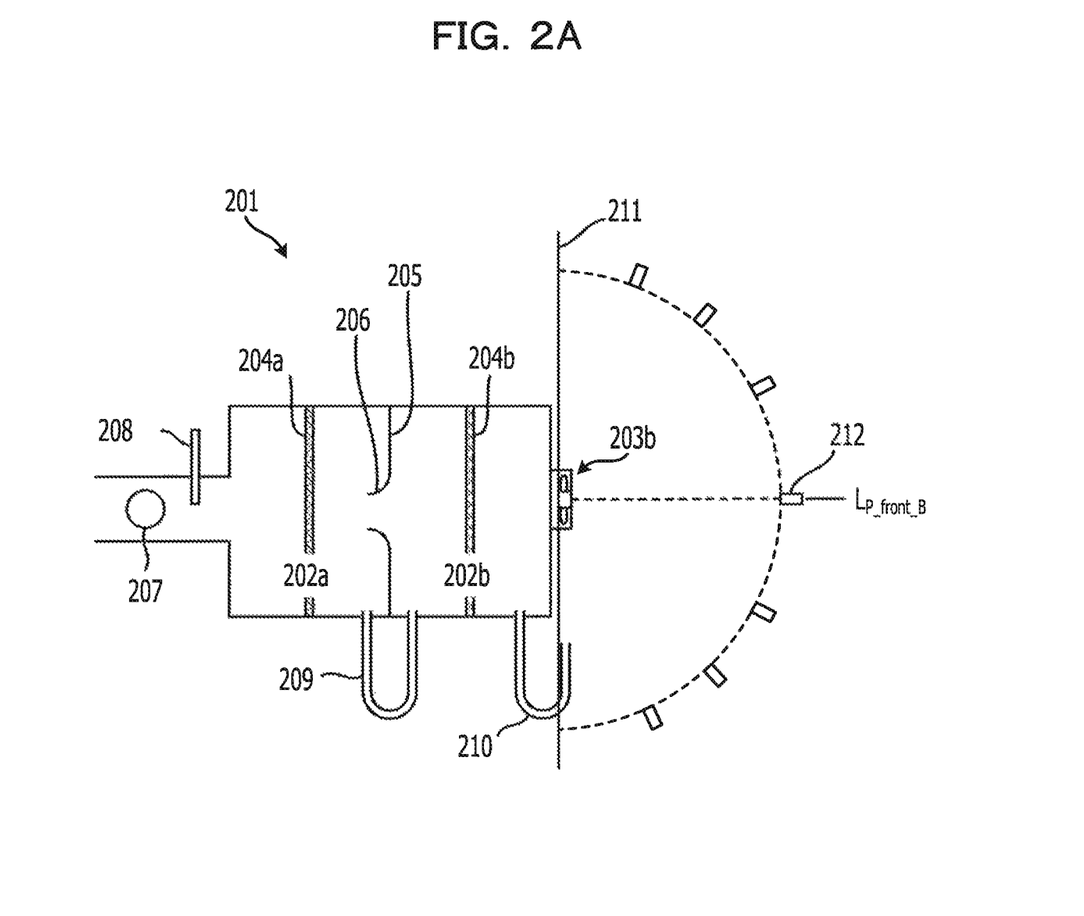
FIG. 2A illustrates a measurement of a sound pressure level of a second fan by using a measurement device for measuring loading noise according to the first embodiment.

With the foregoing configuration, the measurement device 201 measures, using microphones 212, a sound pressure level $L_{P\_front\_A}$ at a distance of 1 meter in front of the first fan 203 (hereinafter "fan A") and sound pressure levels at the locations $L_{P\_1}$, $L_{P\_2}$, $L_{P\_3}$, $L_{P\_4}$, $L_{P\_5}$, and $L_{P\_6}$. As illustrated in FIG. 2A, the measurement device 201 also measures, for example, a sound pressure level $L_{P\_front\_B}$ for a second fan 203b (hereinafter "fan B") that is different from the fan A and whose loading noise is to be predicted, at a distance of 1 meter in front of the fan B, that is, a sound pressure level $L_{P\_front\_B}$ at the location of the microphone where the sound pressure level $L_{P\_front\_A}$ is measured. In other words, the acquisition unit 121 acquires, for example, the sound pressure level $L_{P\_front\_A}$ and sound pressure levels at locations $L_{P\_1}$, $L_{P\_2}$, $L_{P\_3}$, $L_{P\_4}$, $L_{P\_5}$, and $L_{P\_6}$ for the fan A, and the sound pressure level $L_{P\_front\_B}$ for the fan B.

Based on the sound pressure levels for an arbitrary fan (e.g., "fan A") and the sound pressure level for a fan whose loading noise is to be predicted (e.g., "a fan that is a target of prediction" or "fan B"), which have been acquired by the acquisition unit 121, the prediction unit 122 predicts a sound pressure level for the fan that is a target of prediction at a location where the sound pressure level has not yet been measured. Prediction processing by the prediction unit 122 will be described below by taking an example.

It is assumed that the sound pressure level of a predicted value for the fan B is $L_{P\_optional\_B}$, and the sound pressure level of an actual measurement value for the fan A at the same location as that for the fan B is $L_{P\_optional\_A}$. From these, the prediction unit 122 determines a difference $L_{P\_diff1}$ of the sound pressure level for the fan A for each frequency band. This is given by Equation (1).

$$L_{P\_diff1} = L_{P\_front\_A} - L_{P\_optional\_A} \quad (1)$$

Then, using the determined $L_{P\_diff1}$ and the sound pressure level $L_{P\_front\_B}$ for the fan B, the prediction unit 122 determines the sound pressure level $L_{P\_optional\_B}$ of the predicted value for the fan B. This is given by Equation (2).

$$L_{P\_optional\_B} = L_{P\_front\_B} - L_{P\_diff1} \quad (2)$$

In short, based on a plurality of sound pressure levels for the fan A and at least one sound pressure level for the fan B that is measured at the same location as that for the fan A, the loading noise prediction apparatus 100 predicts a sound pressure level for the fan B at a location where the sound pressure level has not yet been measured.

Using the sound pressure level measured by using the measurement device 201 illustrated in FIG. 2 and FIG. 2A allows a sound power level representing the level of the entire energy of sound radiated from a sound source per unit time to be predicted similarly. Such a sound power level is a parameter used for a comparison of noise (sound volume) among fans as commodity products and electronic devices with fans mounted therein. Here, the surface area of the hemisphere at a distance of 1 meter from the fan illustrated in FIG. 2 and FIG. 2A is assumed to be "S".

For example, the loading noise prediction apparatus 100 determines an average energy value $L_{P\_avg\_A}$ of sound pressure levels for the fan A at the locations $L_{P\_front\_A}$, $L_{P\_1}$, $L_{P\_2}$, $L_{P\_3}$, $L_{P\_4}$, $L_{P\_5}$, and $L_{P\_6}$, and determines, for each frequency band, a difference $L_{P\_diff2}$ between the average value and the sound pressure level $L_{P\_front\_A}$ at a distance of 1 meter in front of the fan A. This is given by Equation (3).

$$L_{P\_diff2} = L_{P\_front\_A} - L_{P\_avg\_A} \quad (3)$$

Then, using the sound pressure level $L_{P\_front\_B}$ at a distance of 1 meter in front of the fan B and the determined difference $L_{P\_diff2}$, the loading noise prediction apparatus 100 determines an average predicted value $L_{P\_avg\_B}$ of sound pressure levels for the fan B. This is given by Equation (4).

$$L_{P\_avg\_B} = L_{P\_front\_B} - L_{P\_diff2} \quad (4)$$

Subsequently, using the surface area "S" and the determined average predicted value $L_{P\_avg\_B}$ for the fan B, the loading noise prediction apparatus 100 determines a sound power level $L_{W\_B}$ for the fan B. This is given by Equation (5).

$$L_{W\_B} = 10 \log S + L_{P\_avg\_B} \quad (5)$$

It is to be noted that although a description has been given assuming that the loading noise prediction apparatus 100 determines the average energy value of sound pressure levels for the fan A and the difference between the average energy value and the sound pressure level at a distance of 1 meter in front of the fan A, a difference value ($L_{P\_diff2}$) determined in advance may be acquired and used.

The sound power level may be predicted, for example, using a database having data on the difference between sound power levels measured for a plurality of fans and sound pressure levels measured at locations at a distance of 1 meter in front of the fans. In particular, parameters representing characteristics of a fan whose sound power level is to be predicted are input, data having characteristics close to the characteristics of the fan is acquired from the database, and interpolation correction is performed on the difference in sound pressure level between the fan whose sound power level is to be predicted and the closest data by using the effect of differences in the parameters. Examples of the parameters representing characteristics of a fan include the size, the number of blades, the blade shape, and the rotational speed of the fan.

Loading Noise Prediction Process According to First Embodiment

Figure 3:
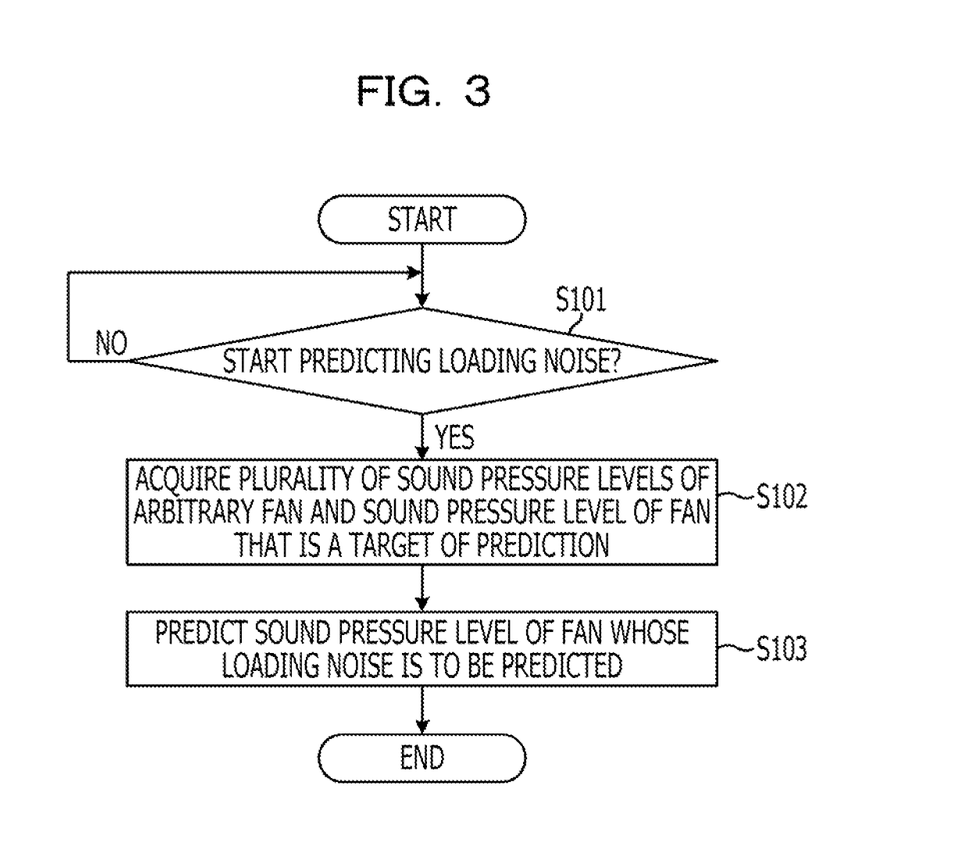
FIG. 3 is a flowchart of a loading noise prediction process according to the first embodiment.

Next, with reference to FIG. 3, a loading noise prediction process according to the first embodiment will be described. FIG. 3 is a flowchart of the loading noise prediction process according to the first embodiment.

For example, as illustrated in FIG. 3, if the acquisition unit 121 starts predicting loading noise (step S101: YES), then the acquisition unit 121 acquires a plurality of sound pressure levels for an arbitrary fan and a sound pressure level for a fan whose loading noise is to be predicted (step S102). The sound pressure level for the fan whose loading noise is to be predicted needs only to be a sound pressure level measured at the same location as any of the plurality of sound pressure levels for the arbitrary fan. Alternatively, if the acquisition unit 121 does not start predicting loading noise, that is, not at the timing of the start of prediction of loading noise (step S101: NO), then the acquisition unit 121 enters a state of waiting for the start of prediction of the loading noise.

Based on the sound pressure levels for the arbitrary fan and the sound pressure level for the fan that is a target of prediction, which have been acquired by the acquisition unit 121, the prediction unit 122 predicts a sound pressure level for the fan that is a target of prediction at a location where the sound pressure level has not yet been measured (step S103). The location where a sound pressure level of the fan whose loading noise is to be predicted has not yet been measured is an arbitrary location where a sound pressure level of the arbitrary fan has been measured.

Effect of First Embodiment

As described above, the loading noise prediction apparatus 100 predicts a sound pressure level for the fan that is a target of prediction at a location where the sound pressure level has not yet been measured, on the basis of the plurality of sound pressure levels for an arbitrary fan and at least one sound pressure level for the fan that is a target of prediction. As a result, the loading noise prediction apparatus 100 can reduce the number of man-hours and cost for obtaining data on loading noise compared to related-art techniques in which the amount of equipment, the number of operation man-hours, and the like for obtaining data required for predicting loading noise increase.

Second Embodiment

In the foregoing first embodiment, a description has been given of the case where, based on sound pressure levels on the intake air side for an arbitrary fan 203 and at least one sound pressure level on the intake air side for a fan 203 that is a target of prediction, a sound pressure level for the fan 203 that is a target of prediction is predicted. The loading noise prediction apparatus 100 can also predict the sound pressure level for the fan 203 that is a target of prediction at a location where a measurement has been performed for the arbitrary fan 203, on the basis of sound pressure levels on the intake air side and exhaust air side for the arbitrary fan 203 and the at least one sound pressure level for the fan 203 that is a target of prediction. In a second embodiment, a description will be given of the case where, based on sound pressure levels on the intake air side and exhaust air side for an arbitrary fan 203 and at least one sound pressure level for a fan 203 that is a target of prediction, the sound pressure level for the fan 203 that is a target of prediction at a location where a measurement has been performed for the arbitrary fan 203 is predicted. In the second embodiment, the configuration of the loading noise prediction apparatus 100 is the same as in the first embodiment, and the description thereof will be omitted.

Measurement Using Measurement Device According to Second Embodiment

Figure 4A:
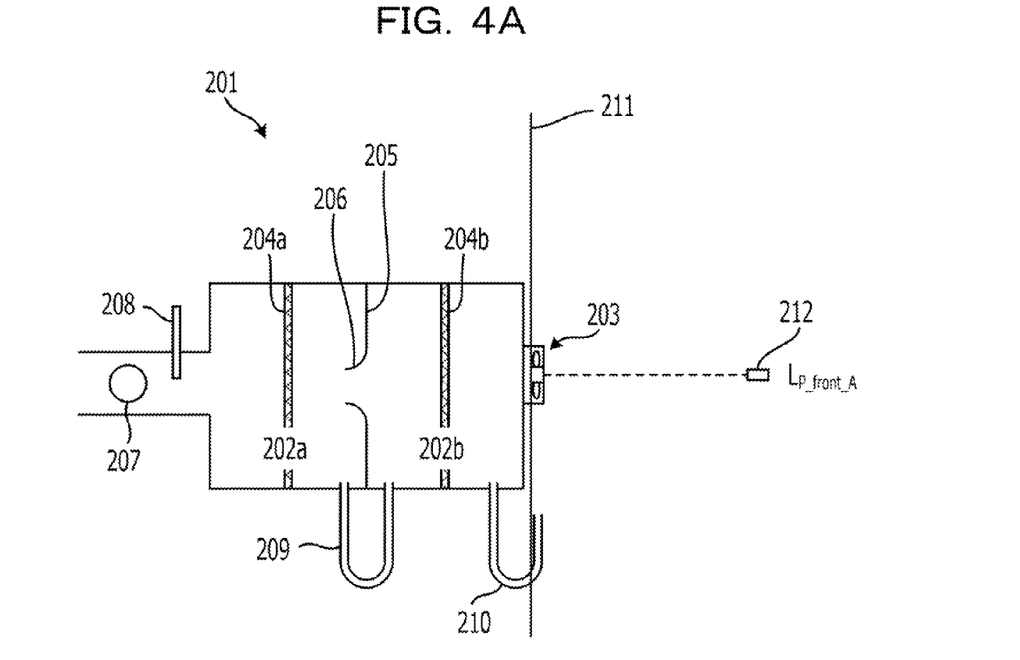
FIGS. 4A and 4B illustrate a measurement of sound pressure levels of a first fan using a measurement device for measuring loading noise according to a second embodiment.
Figure 4B:
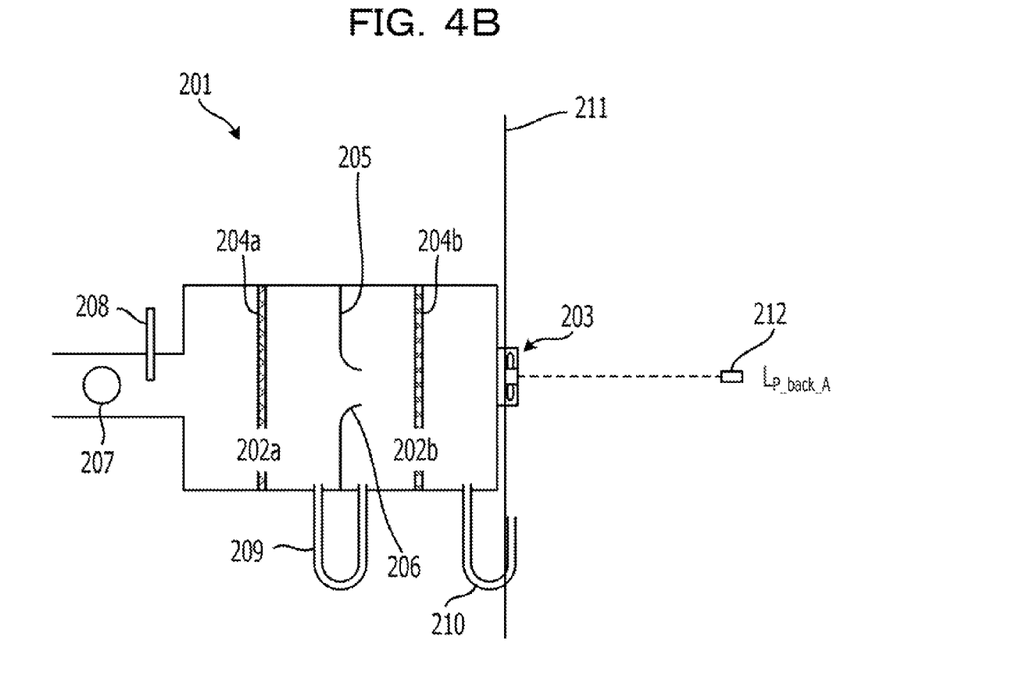
Figure 4C:
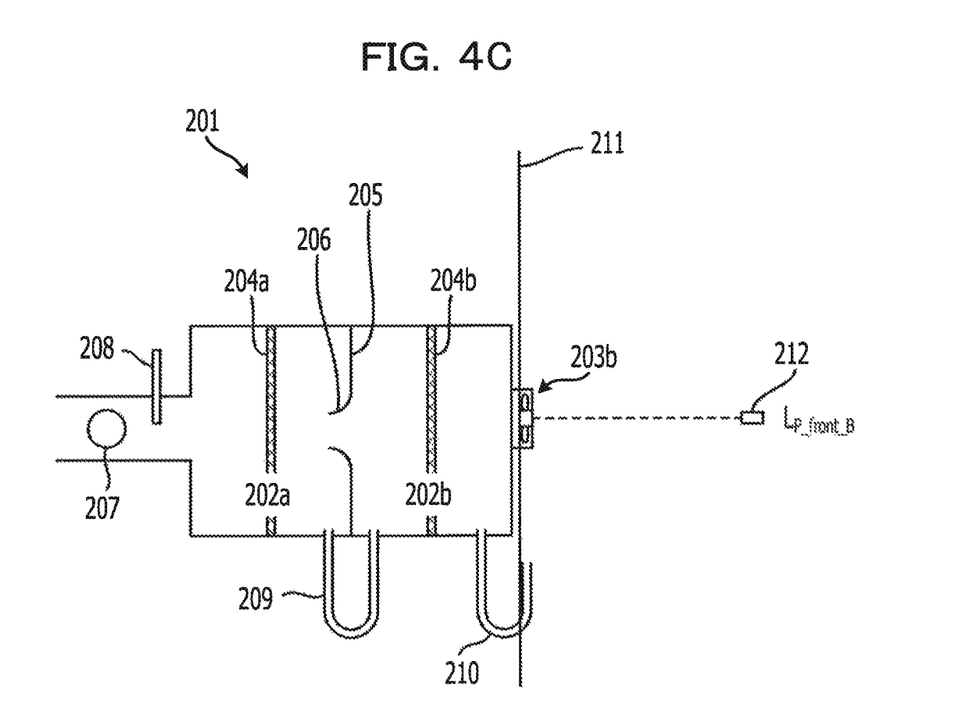
FIG. 4C illustrates a measurement of a sound pressure level of a second fan by using a measurement device for measuring loading noise according to the first embodiment.

With reference to FIGS. 4A-4C, measurements of sound pressure levels using a measurement device 201 for measuring loading noise according to the second embodiment will be described. FIGS. 4A-4C illustrate measurements of sound pressure levels using a measurement device 201 for measuring loading noise according to the second embodiment. The configuration of the measurement device 201 illustrated in FIGS. 4A-4C is the same as that of the measurement device 201 according to the first embodiment illustrated in FIG. 2 and FIG. 2A, and the description thereof will be omitted.

For example, as illustrated in FIG. 4A, a measurement device 201 measures the sound pressure level $L_{P\_front\_A}$ at a distance of 1 meter in front of the intake air side of the fan A. In addition, as illustrated in FIG. 4B, the partition and the nozzle 206 are rotatable and the fan 203 is attached to the measurement device 201 with the intake side thereof toward the chamber 202b. The measurement device 201 measures a sound pressure level $L_{P\_back\_A}$ at a distance of 1 meter in front of the exhaust air side of the fan A. As illustrated in FIG. 4C, the measurement device also measures, for example, the sound pressure level of the fan B (i.e., ref. 203b) that is different from the fan A and whose loading noise is to be predicted, at a distance of 1 meter in front of the intake air side of the fan B. That is, a sound pressure level $L_{P\_front\_B}$ is measured at the location of the microphone where the sound pressure level $L_{P\_front\_A}$ has been measured.

In other words, the acquisition unit 121 acquires, for example, the sound pressure levels $L_{P\_front\_A}$ and $L_{P\_back\_A}$ for the fan A, and the sound pressure level $L_{P\_front\_B}$ for the fan B. Prediction processing by the prediction unit 122 will be described below by taking an example.

The prediction unit 122 determines a difference $L_{P\_diff3}$ between the sound pressure levels $L_{P\_front\_A}$ and $L_{P\_back\_A}$ on the intake air side and exhaust air side of the fan A acquired by the acquisition unit 121, for each frequency band. This is given by Equation (6).

$$L_{P\_diff3} = L_{P\_front\_A} - L_{P\_back\_A} \quad (6)$$

Then, using the determined $L_{P\_diff3}$ and the sound pressure level $L_{P\_front\_B}$ on the intake air side of the fan B, the prediction unit 122 determines a sound pressure level $L_{P\_back\_B}$ of the predicted value on the exhaust air side of the fan B. This is given by Equation (7).

$$L_{P\_back\_B} = L_{P\_front\_B} - L_{P\_diff3} \quad (7)$$

In short, based on a plurality of sound pressure levels on the intake air side and exhaust air side of the fan A and at least one sound pressure level of the fan B that is measured at the same location as that on the intake air side of the fan A, the loading noise prediction apparatus 100 predicts the sound pressure level on the exhaust air side of the fan B at a location where the sound pressure level has not yet been measured. In the second embodiment, prediction of sound power levels can be performed in the same processing as in the first embodiment, and the description thereof will be omitted.

Loading Noise Prediction Process According to Second Embodiment

Figure 5:
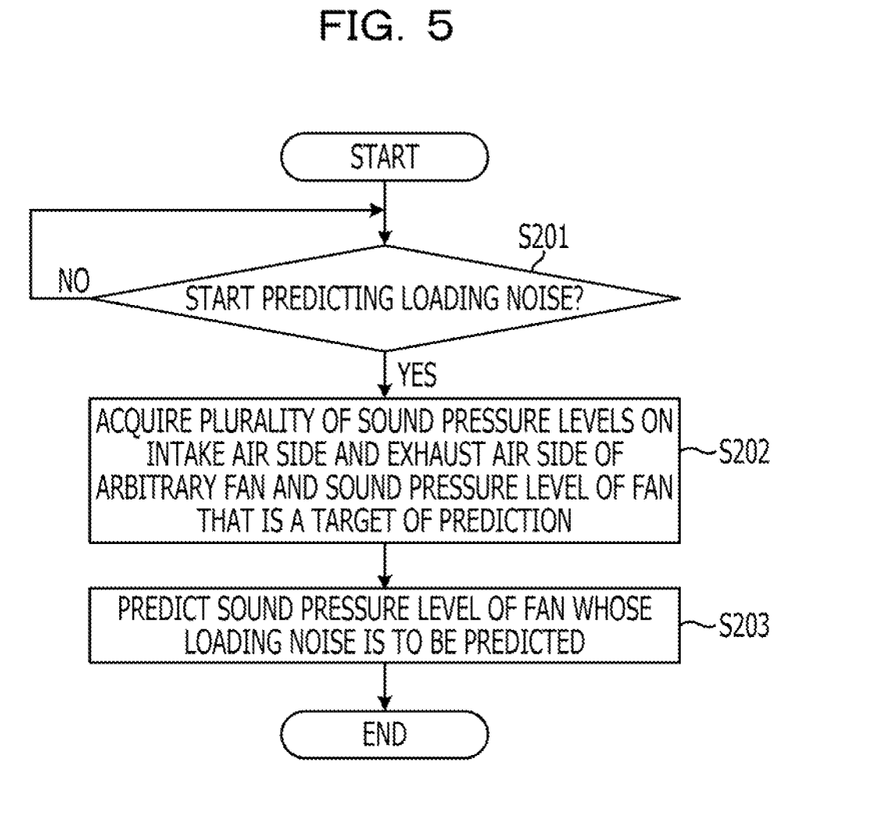
FIG. 5 is a flowchart of a loading noise prediction process according to the second embodiment.

Next, with reference to FIG. 5, a loading noise prediction process according to the second embodiment will be described. FIG. 5 is a flowchart of the loading noise prediction process according to the second embodiment.

For example, as illustrated in FIG. 5, if the acquisition unit 121 starts predicting loading noise (step S201: YES), then the acquisition unit 121 acquires a sound pressure levels on the intake air side of an arbitrary fan, a sound pressure level on the exhaust air side of the arbitrary fan and a sound pressure level of a fan whose loading noise is to be predicted (step S202). The sound pressure level of the fan whose loading noise is to be predicted needs only to be a sound pressure level measured at the same location as any of the sound pressure levels of the arbitrary fan. Alternatively, if the acquisition unit 121 does not start predicting loading noise, that is, not at the timing of the start of prediction of loading noise (step S201: NO), then the acquisition unit 121 enters a state of waiting for the start of prediction of the loading noise.

Based on the sound pressure levels on the intake air side and exhaust air side of the arbitrary fan and the sound pressure level of the fan that is a target of prediction, which have been acquired by the acquisition unit 121, the prediction unit 122 predicts a sound pressure level of the fan that is a target of prediction at a location where the sound pressure level has not yet been measured (step S203). The location where the sound pressure level of the fan whose loading noise is to be predicted has not yet been measured is an arbitrary location where a sound pressure level of the arbitrary fan has been measured. In the foregoing example, the location where the sound pressure level has not yet been measured is a location at a distance of 1 meter in front of the exhaust air side of the fan that is a target of prediction.

Effect of Second Embodiment

As described above, the loading noise prediction apparatus 100 predicts the sound pressure level of the fan that is a target of prediction at a location where the sound pressure level has not yet been measured, on the basis of the plurality of sound pressure levels on the intake air side and exhaust air side of an arbitrary fan and at least one sound pressure level of the fan that is a target of prediction. As a result, the loading noise prediction apparatus 100 can reduce the number of man-hours and cost for obtaining data on loading noise compared to related-art techniques in which the amount of equipment, the number of operation man-hours, and the like for obtaining data required for predicting loading noise increase.

Third Embodiment

The embodiments of the loading noise prediction apparatus provided herein have been described. The loading noise prediction apparatus provided herein may be made in various different forms in addition to the foregoing embodiments. Accordingly, an embodiment will be described that differs from the foregoing embodiments in (1) prediction on the exhaust air side, (2) predication on the intake air side from the exhaust air side, (3) the configuration of the apparatus, and (4) a program.

(1) Prediction on Exhaust Air Side

In the foregoing first embodiment, a description has been given of the case where, based on a plurality of sound pressure levels on the intake air side of an arbitrary fan and a sound pressure level on the intake air side of a fan that is a target of prediction, a sound pressure level that has not yet been measured on the intake air side of the fan that is a target of prediction is predicted. The loading noise prediction apparatus 100 can predict sound pressure levels not only on the foregoing intake air side but also on the exhaust air side.

For example, the measurement device measures not only a sound pressure level at a distance of 1 meter in front of the exhaust air side of the fan A but also sound pressure levels at locations of microphones 212 on the exhaust air side of the fan A. The measurement device also measures, for example, a sound pressure level at a distance of 1 meter in front of the exhaust air side of the fan B that is different from the fan A and whose loading noise is to be predicted. That is, the loading noise prediction apparatus 100 acquires, for example, a plurality of sound pressure levels on the exhaust air side of the fan A and at least one sound pressure level on the exhaust air side of the fan B. Thereafter, the loading noise prediction apparatus 100 determines a difference between the sound pressure levels of the actual measurement values for the fan A for each frequency band, and, on the basis of the determined difference and the sound pressure level of the actual measurement value for the fan B, predicts sound pressure levels, at locations where the sound pressure levels have not yet been measured, on the exhaust air side of the fan B.

(2) Prediction on Intake Air Side from Exhaust Air Side

In the foregoing second embodiment, a description has been given of the case where, based on sound pressure levels on the intake air side and exhaust air side of an arbitrary fan and a sound pressure level on the intake air side of a fan that is a target of prediction, a sound pressure level that has not yet been measured on the exhaust air side of the fan that is a target of prediction is predicted. The loading noise prediction apparatus 100 can predict not only a sound pressure level that has not yet been measured on the foregoing exhaust air side but also a sound pressure level that has not yet been measured on the intake air side.

Figure 6A:
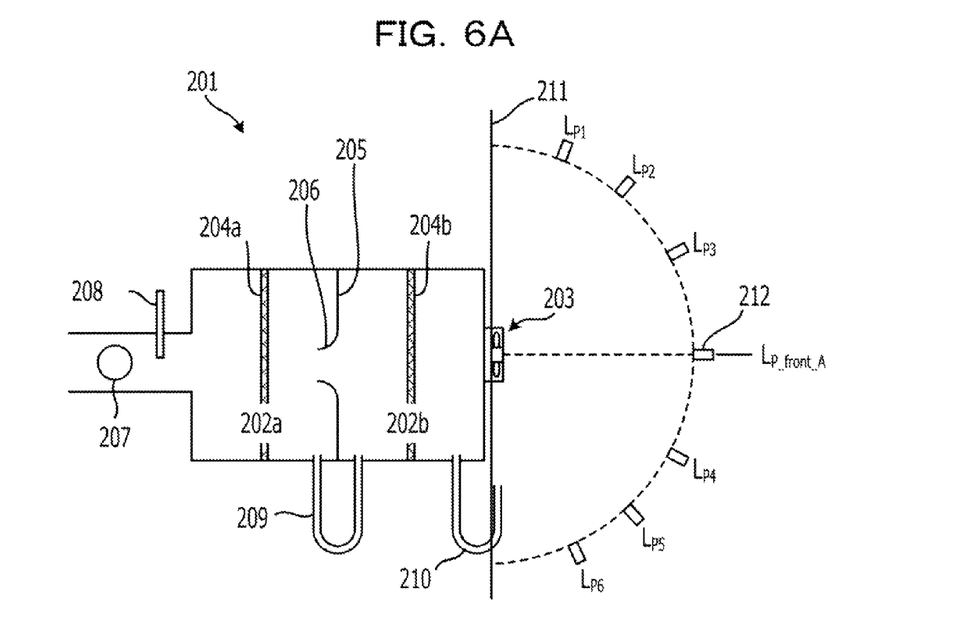
FIGS. 6A and 6B illustrates a measurement of sound pressure levels using a measurement device for measuring loading noise according to an embodiment other than the first and the second embodiments.
Figure 6B:
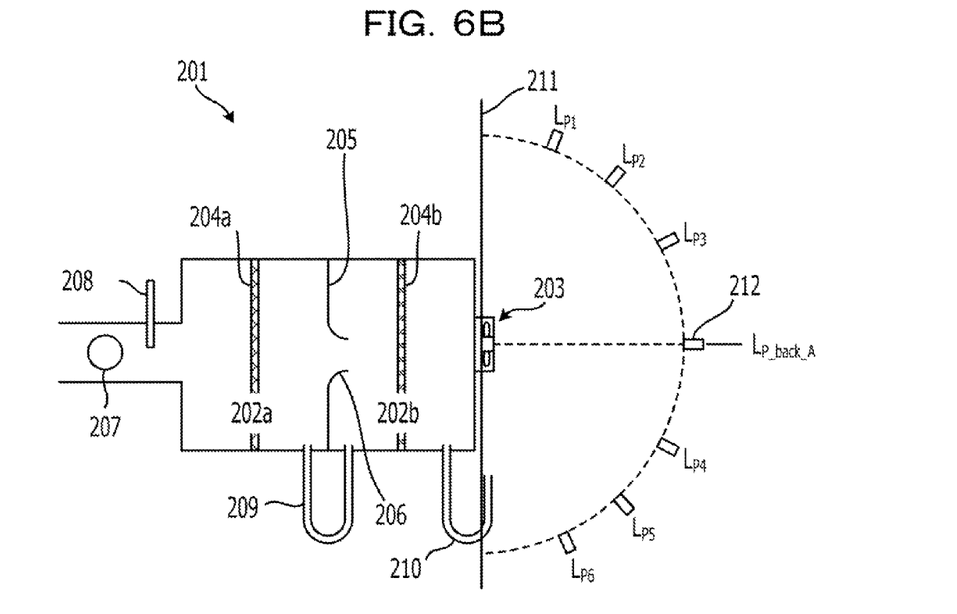
Figure 7:
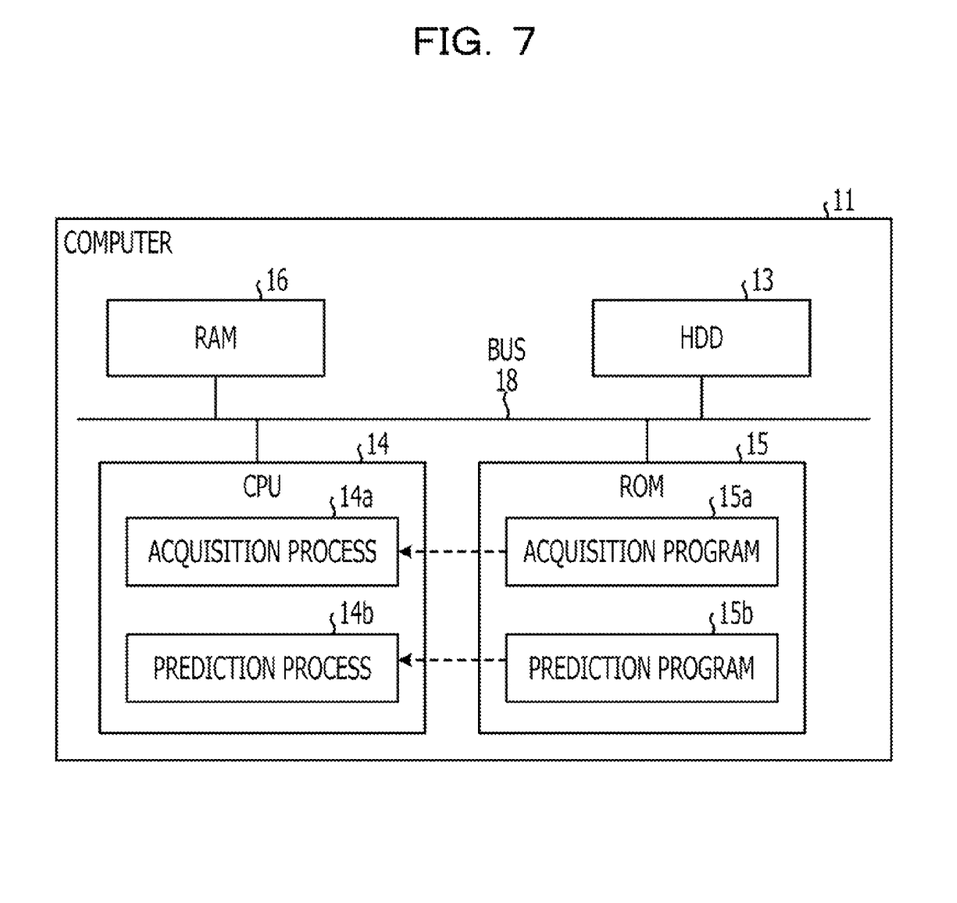
FIG. 7 illustrates an exemplary computer for executing a loading noise prediction program.

For example, as illustrated in FIG. 6A, the measurement device 201 measures a sound pressure level "$L_{P\_front\_A}$" at a distance of 1 meter in front of the intake air side of the fan A and sound pressure levels at locations of $L_{P\_1}$, $L_{P\_2}$, $L_{P\_3}$, $L_{P\_4}$, $L_{P\_5}$, and $L_{P\_6}$ on the intake air side of the fan A. In addition, as illustrated FIG. 6B, the measurement device measures a sound pressure level "$L_{P\_back\_A}$" at a distance of 1 meter in front of the exhaust air side of the fan A. The measurement device also measures, for example, a sound pressure level at a distance of 1 meter in front of the exhaust air side of the fan B that is different from the fan A and whose loading noise is to be predicted. That is, the loading noise prediction apparatus 100 acquires, for example, a plurality of sound pressure levels on the intake air side and exhaust air side of the fan A and at least one sound pressure level on the exhaust air side of the fan B. Thereafter, the loading noise prediction apparatus 100 determines a difference between the sound pressure levels of the actual measurement values for the fan A for each frequency band, and, on the basis of the determined difference and the sound pressure level of the actual measurement value for the fan B, predicts sound pressure levels, at locations where the sound pressure levels have not yet been measured, on the intake air side of the fan B.

(3) Configuration of Apparatus

Processing procedures, control procedures, specific names, information including various kinds of data, parameters, and the like described in the foregoing document and illustrated in the drawings may be arbitrarily changed unless otherwise noted. For example, chambers 202a and 202b and elements included therein in the measurement device are not intended to be limited to those illustrated in the drawings in terms of the shape, quantity, and locations at which they are disposed, and may be arbitrarily changed. The number of microphones 212, and the like are not intended to be limited to those illustrated in the drawings. Also, regarding the microphones 212, a description has been given assuming that, for example, a microphone is disposed at a location at a distance of 1 meter in front of a fan; the distance from the fan may also be arbitrarily changed. Further, regarding an arbitrary fan and a fan that is a target of prediction, errors are taken into consideration, and therefore the foregoing embodiments are carried out using fans similar in kind. This enables prediction to be performed with higher accuracy.

The illustrated elements of the loading noise prediction apparatus 100 are conceptual functions and need not be physically configured as illustrated in the drawings. That is, specific forms of separation and integration of each device are not limited to those illustrated in the drawings, and all or part of each device may be functionally and physically separated and integrated in arbitrary units depending on various burdens, usage states, and the like.

(4) Program

In the foregoing embodiments, a description has been given of the case where various kinds of processing are implemented by hardware logic. The processing may be implemented by causing a computer to execute a program provided in advance. Hereinbelow, with reference to FIG. 6, a description will be given of an exemplary computer that executes a loading noise prediction program having the same functions as the loading noise prediction apparatus 100 described in the foregoing embodiments. FIG. 6 illustrates an exemplary computer that executes a loading noise prediction program.

As illustrated in FIG. 6, a computer 11 serving as the loading noise prediction apparatus 100 includes an HDD (Hard Disk Drive) 13, a CPU (Central Processing Unit) 14, a ROM (Read Only Memory) 15, a RAM (Random Access Memory) 16, and the like. The HDD 13, CPU 14, ROM 15, and RAM 16 are connected through a bus 18.

In the ROM 15, a loading noise prediction program that exerts the same functions as the loading noise prediction apparatus 100 described in the foregoing embodiments is stored in advance. That is, in the ROM 15, as illustrated in FIG. 6, an acquisition program 15a and a prediction program 15b are stored in advance. The program 15a through the program 15b may be appropriately integrated or separated in the same manner as various elements of the loading noise prediction apparatus 100 illustrated in FIG. 1.

The CPU 14 reads the program 15a through the program 15b from the ROM 15, and executes them. Thus, as illustrated in FIG. 6, the program 15a and the program 15b function as an acquisition process 14a and a prediction process 14b. The acquisition process 14a through the prediction process 14b correspond to the acquisition unit 121 and the prediction unit 122 illustrated in FIG. 1. The CPU 14 executes the loading noise prediction program on the basis of data recorded in the RAM 16.

It is to be noted that the foregoing program 15a through the program 15b need not be stored from the beginning in the ROM 15. For example, each program may be stored in a "portable physical medium", such as a flexible disk (FD), a compact disk (CD)-ROM, a DVD (Digital Versatile Disk), a magneto-optical disk, or an IC (Integrated Circuit) card, to be inserted into the computer 11. For example, each program may also be stored in a "fixed physical medium" such as an HDD provided inside or outside of the computer 11. Alternatively, for example, each program may be stored in "another computer (or server)" connected to the computer 11 via a public circuit, the Internet, a LAN (Local Area Network), a WAN (Wide Area Network), or the like. The computer 11 may read each program from such a network and execute the program.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention has been described in detail, it should be understood that various changes, substitutions, and alterations could be made hereto without departing from the spirit and scope of the invention.

What is claimed is:

1. A sound pressure level prediction method, the method comprising:
    acquiring, using an acquisition unit, sound pressure levels for a first fan measured at a plurality of locations forming a hemispherical path around the first fan, and at least one sound pressure level for a second fan, the second fan being different from the first fan and the at least one sound pressure level being measured at the same location as at least one of the plurality of locations, along the hemispherical path, used for measuring the sound pressure levels for the first fan; and
    predicting, using a prediction unit and based on the acquired sound pressure levels for the first fan and the at least one sound pressure level for the second fan, a sound pressure level for the second fan at a location along a hemispherical path around the second fan, where the sound pressure level for the second fan at the location along the hemispherical path around the second fan has not yet been measured.

2. The method according to claim 1, wherein
the acquired sound pressure levels for the first fan and the second fan are measured at an intake side of the first fan and the second fan, and
the predicted sound pressure level for the second fan corresponds to a location at an intake side of the first fan.

3. The method according to claim 1, wherein
by using the acquisition unit, acquiring sound pressure levels measured at locations on an intake air side and an exhaust air side for the first fan and at least one sound pressure level for the second fan, the at least one sound pressure level being measured at the same location as used for measuring the sound pressure levels on the intake air side or the exhaust air side for the first fan; and
based on the acquired sound pressure levels for the first fan and the at least one sound pressure level for the second fan, predicting a sound pressure level for the second fan at a location on the intake air side or the exhaust air side where the sound pressure level has not yet been measured.

4. A sound pressure level prediction apparatus comprising:
a storage unit for storing measured sound pressure levels;
an acquisition unit configured to acquire sound pressure levels for a first fan measured at a plurality of locations forming a hemispherical path around the first fan and at least one sound pressure level for a second fan, the second fan being different from the first fan, and the at least one sound pressure level being measured at the same location as at least one of the plurality of locations, along the hemispherical path, used for measuring the sound pressure levels for the first fan; and
a prediction unit configured to predict, based on the acquired sound pressure levels of the first fan and the at least one sound pressure level for the second fan, a sound pressure level for the second fan at a location along a hemispherical path around the second fan, where the sound pressure level for the second fan at the location along the hemispherical path around the second fan has not yet been measured.

5. A non-transitory information storage medium for storing instructions, which when executed by a processor, perform a sound pressure level prediction method, the method comprising:
acquiring, using an acquisition unit, sound pressure levels for a first fan measured at a plurality of locations forming a hemispherical path around the first fan, and at least one sound pressure level for a second fan, the second fan being different from the first fan and the at least one sound pressure level being measured at the same location as at least one of the plurality of locations, along the hemispherical path, used for measuring the sound pressure levels for the first fan; and
predicting, using a prediction unit and based on the acquired sound pressure levels for the first fan and the at least one sound pressure level for the second fan, a sound pressure level for the second fan at a location along a hemispherical path around the second fan, where the sound pressure level for the second fan at the location along the hemispherical path around the second fan has not yet been measured.

\* \* \* \* \*